March 7, 1939.　　　S. K. WELLMAN　　　2,149,374

SHOCK ABSORBER

Filed April 11, 1935　　　2 Sheets-Sheet 1

INVENTOR.
SAMUEL K. WELLMAN
BY
Kwis Hudson & Kent
ATTORNEYS

March 7, 1939.   S. K. WELLMAN   2,149,374
SHOCK ABSORBER
Filed April 11, 1935   2 Sheets-Sheet 2
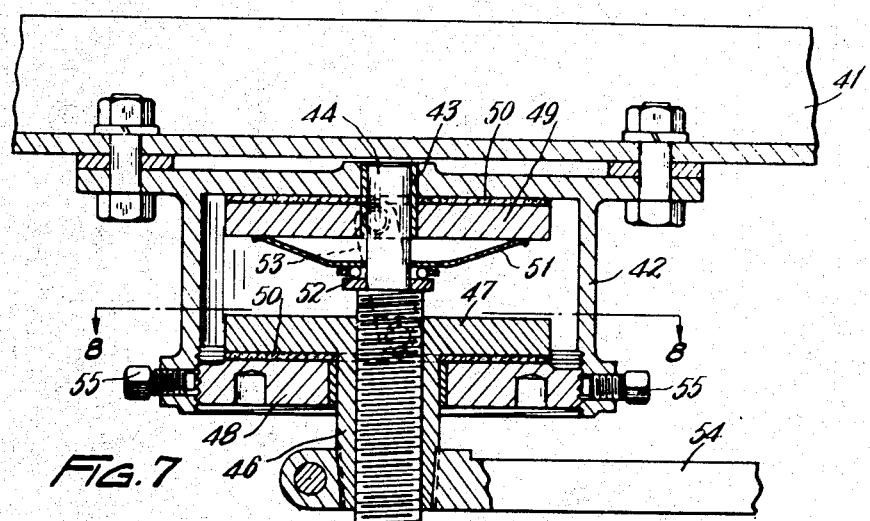
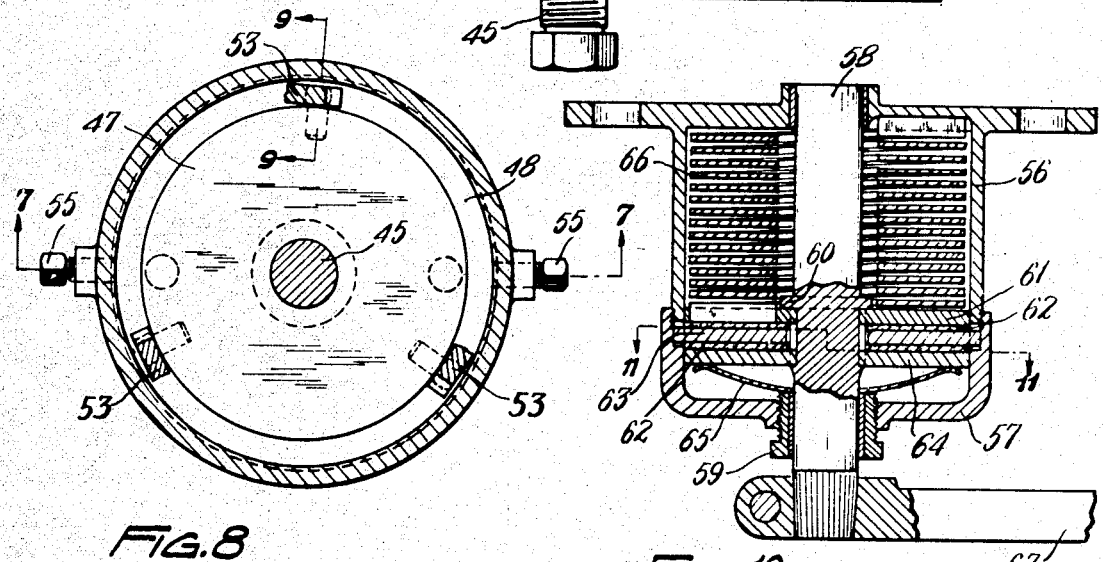
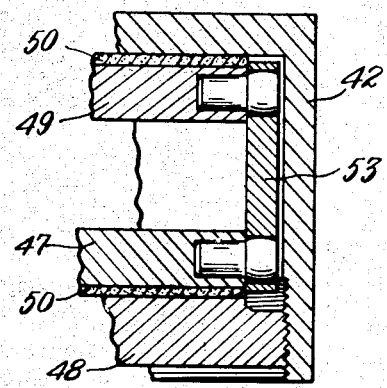
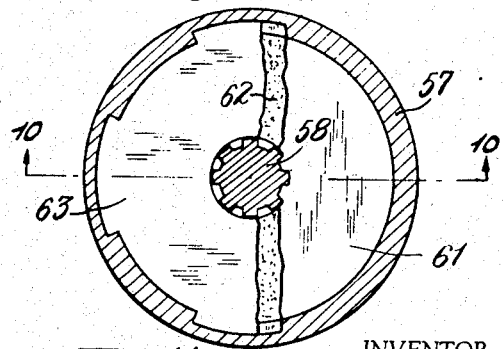
INVENTOR.
SAMUEL K. WELLMAN
BY Kwis Hudson & Kent
ATTORNEYS Patented Mar. 7, 1939

2,149,374

UNITED STATES PATENT OFFICE 2,149,374

SHOCK ABSORBER

Samuel K. Wellman, Cleveland Heights, Ohio

Application April 11, 1935, Serial No. 15,844

24 Claims. (Cl. 188—130)

This invention relates to a shock aborber and more specifically to a friction shock absorber especially adapted for use upon motor vehicles, but susceptible of other and further uses.

An object of the invention is to provide a friction shock absorber which functions substantially uniformly at all times irrespective of changes in temperature or in speeds of operation.

Another object is to provide a friction shock absorber which is substantially noiseless in operation.

A further object is to provide a friction shock absorber which accomplishes the foregoing objects and wherein one degree of frictional resistance is set up with the impact or vehicle spring compression stroke, while a greater degree of frictional resistance is set up for the recoil or vehicle spring expansion stroke.

Another object is to provide a friction shock absorber which has a long operative life and which will not require frequent servicing or adjusting.

A still further object is to provide a friction shock absorber wherein the parts are always in the proper operative relationship irrespective of the load imposed upon the vehicle springs.

Another object is to provide friction shock absorbers which function efficiently with vehicle springs of the type now used and which impart to the vehicle the proper riding qualities.

Another object is to provide a friction shock absorber which is simple in construction and which may be economically manufactured.

Further and additional objects and advantages inherent in the invention will become apparent hereinafter.

In accomplishing the objects specified and the objects later to become apparent during the detailed description that is to follow of certain embodiments of the invention, it is contemplated to employ in a friction shock absorber for the friction material thereof a material which is suitable for use as a bearing material and which has therefore a relatively low coefficient of friction. It is further contemplated to employ for the friction material a material which is substantially unaffected by temperature variations and which will have a substantially constant coefficient of friction regardless of speeds within the ordinary working range as, for example, the material will have approximately the same coefficient of friction for the "break-away" movement as for later movements. The material which it is contemplated to employ as the friction material of the shock absorber has the further characteristic that it will not produce squeaks when moving in contact with metal or other members which, of course, renders the material extremely advantageous for use in shock absorbers for motor vehicles. More specifically, the present invention contemplates the use in a friction shock absorber as the friction member thereof of a member formed of bearing material and comprising finely powdered metal and graphite compressed and sintered into a homogeneous mass. A material which will attain the objects sought for when used as a friction material in a shock absorber is such as that disclosed in Gilson Patent No. 1,177,407, issued March 28, 1916, and wherein the material is described as comprising an alloy of copper, tin and lead consolidated to a coherent solid mass and having finely divided graphite distributed throughout the mass with the alloy material in excess of the graphite.

In the accompanying drawings there are illustrated several embodiments of the invention, one of which is now deemed to be the preferred mechanical form of the invention, while the others embrace supplemental mechanical forms thereof.

Referring to the accompanying drawings:

Fig. 7 is a transverse sectional view similar to Fig. 3, but illustrating a different form of shock absorber embodying the invention from that shown in Fig. 3.

Fig. 8 is a sectional view taken substantially on line 8—8 of Fig. 7, looking in the direction of the arrows.

Fig. 9 is a detailed sectional view taken substantially on line 9—9 of Fig. 8, looking in the direction of the arrows.

Figure 3:
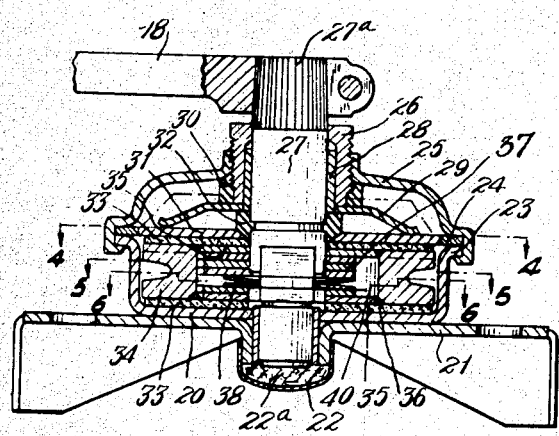
Fig. 3 is a transverse sectional view taken substantially on line 3—3 of Fig. 2, looking in the direction of the arrows.
Figure 4:
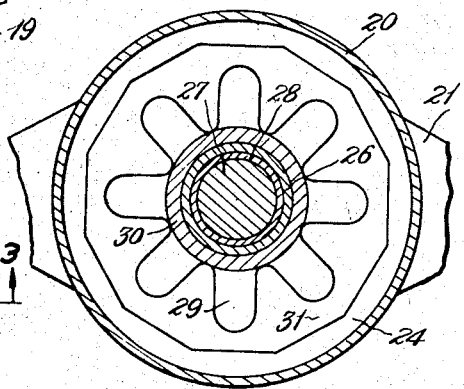
Fig. 4 is a sectional view taken substantially on the irregular line 4—4 of Fig. 3, looking in the direction of the arrows.
Figure 5:
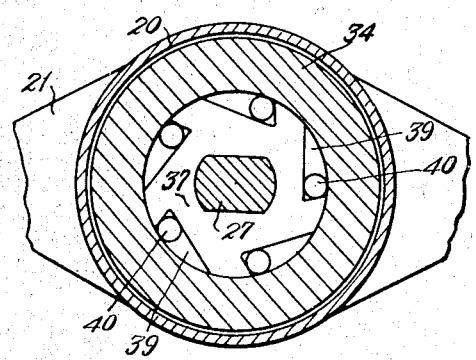
Fig. 5 is a sectional view taken substantially on the irregular sectional line 5—5 of Fig. 3, looking in the direction of the arrows.
Figure 6:
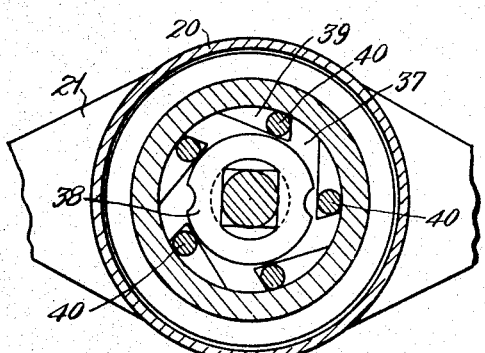
Fig. 6 is a sectional view taken substantially on the irregular line 6—6 of Fig. 3, looking in the direction of the arrows.

Fig. 10 is a transverse sectional view similar to Figs. 3 and 7 but illustrating a still different form of shock absorber embodying the invention from those shown in said figures, said Fig. 10 being taken substantially on line 10—10 of Fig. 11, looking in the direction of the arrows, and Fig. 11 is a sectional view taken substantially on line 11—11 of Fig. 10 looking in the direction of the arrows.

The mechanical embodiment of the invention illustrated in Figs. 1 to 6, inclusive constitutes what is now believed to be the preferred form thereof, but it should be clearly understood that the applicant in designating this form as the preferred one does not intend to limit himself in any way, since other embodiments of the invention may subsequently be devised and regarded as the preferred form thereof.

Referring to said Figs. 1 to 6, inclusive, the shock absorber is secured to the sides of the chassis frame 15 of a motor vehicle at the front and rear and is operatively connected to the front axle 16 and the rear axle (not shown) thereof by means of pivotally connected links 17 and levers 18 as is usual and as is fully understood in the art, the upward movement of the axle 16 to compress the vehicle spring 19 causes a movement of the lever 18 and the operative parts of the shock absorber, later to be referred to, in one direction, while the movement of the axle 16 downwardly during the recoil of the spring 19 causes movement of the lever 18 and the said operative parts in the opposite direction. The first movement of the axle 16 will hereinafter be referred to as the "impact" stroke or movement, while the second movement will be referred to as the "recoil" movement. It is desirable, particularly with the modern type of automobile springs now in use, that shock absorbers be capable of producing one degree of braking action during the "impact" stroke and a greater degree of braking action during the "recoil" stroke. As will later be pointed out, the present construction attains this end in a very efficient and simple manner due, not only to its mechanical construction, but in large part to the use of a suitable bearing material for the friction material as has been previously referred to.

Figure 1:
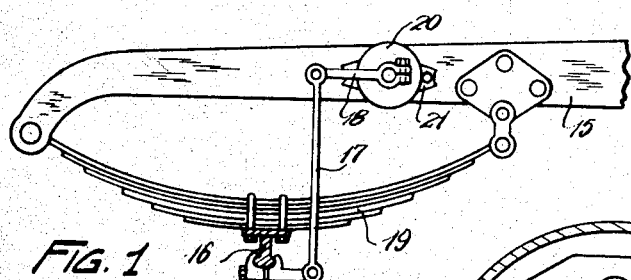
Fig. 1 is a fragmentary elevational view partly in section of an automobile chassis and shows a shock absorber embodying the invention mounted upon the side of the chassis frame and operatively connected to the axle.
Figure 2:
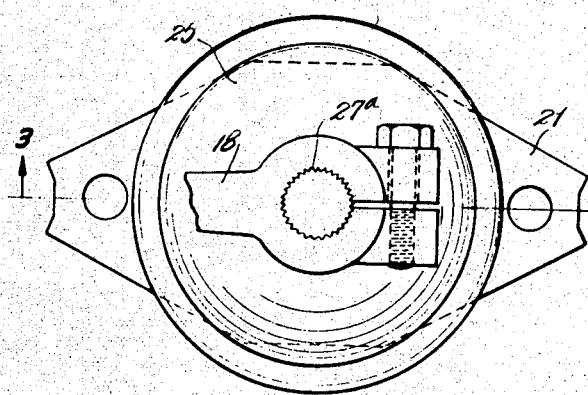
Fig. 2 is an enlarged detailed elevational view of the shock absorber shown in Fig. 1.

The shock absorber shown in Figs. 1 to 6, inclusive, comprises a casing or cylinder 20 which is suitably secured to an attaching bracket 21 that is bolted or otherwise connected to the chassis frame as shown in Fig. 1. The attaching bracket 21 is provided with a flanged opening registering with an opening at the bottom of the casing 20 for a purpose later to be explained, such flanged opening being closed by a dust cover 22 containing suitable packing 22a.

The casing or cylinder 20 is open at one end and is provided with an annular outturned flange 23 upon which is positioned, and preferably spot-welded or otherwise secured thereo, a ring 24, the inner circumference of which is of polygonal configuration so that the ring serves as an anchor for a recoil plate, as will later be explained. The casing 20 or cylinder is closed by a cover or head 25 having a portion bearing upon the upper side of the ring 24 and from which a downwardly and inwardly extending portion embraces and is permanently secured to the flange 23 of the casing by any suitable means, wherefore, it will be impossible to remove the cover or head from the shock absorber, thus eliminating inexperienced field servicing of the shock absorber for a reason later to become apparent.

The cover or head for the casing or cylinder 20 is somewhat dome-shaped and is provided at its outer center with a tapped opening into which is threaded an adjusting screw 26 which is of such length as to extend above the cover 25 and a substantial distance into the shock absorber. The adjusting screw 26 is provided with a bore through which the shock absorber shaft 27 extends, which bore includes an enlarged portion into which is arranged a graphite bushing 28. A pressure spring 29 surrounds the shaft 27 and the graphite bushing 28 and is engaged on its upper side by the inner end of the adjusting screw 26 and by a suitable packing gasket 30. The pressure spring 29 bears upon the outer side of a recoil plate 31 having a polygonal periphery interfitting the internal configuration of the anchoring ring, wherefore, the plate 31 is held against rotating movement in the casing.

The plate 31 surrounds the shaft 27, it being noted that a suitable packing gasket 32 is interposed between the shaft 27, pressure spring 29 and plate 31. In referring hereinafter to the plate 31, the same will be called the recoil plate.

A disk or wafer 33 formed of a material suitable for use as a bearing material is arranged immediately beneath and in engagement with the recoil plate 31 and has a central opening through which the shaft 27 extends so as to be freely rotatable therein. It will be understood that the disk 33 in place of being formed entirely of the bearing material could be in the form of a composite disk, that is, the bearing material could be mounted upon a backing plate of metal. A driving ring 34 is arranged in the casing or cylinder 20 so as to rotate therein and is in engagement on its upper side, as viewed in the drawings, with the disk or wafer 33 and on its lower side with a similar disk or wafer which in turn is in engagement with the bottom of the casing or cylinder.

Arranged within the driving ring 34 and in engagement with the disks or wafers 33 are driving plates 35 which are rotatable with the shaft 27, it being noted that suitable gaskets 36 seal the spaces between the driving plate 35 and the driving ring 34. Intermediate the driving plates 35 are a plurality of cam plates 37 arranged on the shaft 27 so as to turn therewith and with the driving plates 35, there being shown in the present illustration four cam plates 37 with the upper three, as viewed in the drawings, grouped together and separated from the lower one by cam plate springs 38 which act to hold the cam plates and the driving plates in engagement with the wafers 33. The cam plates 37 are provided on their peripheries with recesses 39 that gradually increase in depth, from the peripheries of the plates, there being in the present instance five of the recesses 39 in each plate. In each recess there is arranged a cam roller 40, wherefore, when the shaft 27 and the cam plates 37 revolve in one direction, the rollers will occupy the deep end of the recesses 39 and will loosely engage the inner circumference of the driving ring 34, but when the shaft 27 and cam plates 37 move in the opposite direction the rollers 40 will pass into the narrow portions of the recesses and will be wedged between the cam plates and the inner circumference of the driving ring 34, to the end that said driving ring will move with the cam plates.

The lever 18 is secured to the outer end of the shaft 27 so that the lever and shaft will move in unison and to this end the shaft is shown as being provided with longitudinally extending serrations 27a that cooperate with similar serrations in the split tubular end of the lever 18, the two parts of such split end being held in clamping engagement on the shaft 27 by means of a suitable bolt as is well understood in the art.

It will be understood that the shock absorber is mounted upon a vehicle in the manner shown in Fig. 1 and in such a way that the impact stroke effects a movement of the lever 18 and the shaft 27 in a direction to cause the rollers 40 to travel with the cam plates 37 in the deepest portion of the recesses 39, and that during this movement the driving ring 34 is stationary. It will be noted, however, that the driving plates 35 move during this rotation of the shaft 27 and, since said plates are in engagement with the disks or wafers 33, a frictional resistance will be set up against the movement of the shaft 27 and the compression of the vehicle spring 19, thus retarding the effect of the impact movement of the spring 19 and, of course, improving the riding qualities of the vehicle. It will further be understood that the degree of retarding effect, not only during the impact stroke, but on the recoil stroke, can be regulated by means of the adjusting screw 26 which engages the pressure spring 29 that holds the recoil plate 31 in engagement with the outer disk or wafer 33.

During the stroke occasioned by the recoil or expansion of the vehicle spring 19 the shaft 27 will be turned in the opposite direction from that previously referred to with the result that the cam rollers 40 will be wedged in the shallow portions of the recesses 39 between the cam plates 37 and the inner circumference of the driving ring 34, so that said driving ring will move with the cam plates and with the driving plates 35. It will be noted that when this occurs not only do the driving plates 35 turn in engagement with the disks or wafers 33, but also the driving ring 34 with the result that there is created a substantially greater resistance to the turning movement of the shaft 27 and to the expansion of the spring 19 than took place when the shaft 27 was turning during the contraction of the spring 19.

As previously explained the disks or wafers 33 are formed of a material suitable for use as a bearing material such as the material shown in Gilson Patent 1,177,407. This material has been found to be homogeneous and to have a substantially uniform low coefficient friction irrespective of temperature changes and speed variations within such limits as would ever occur in actual practice. The employment of a material of this character in a shock absorber results in the production of a shock absorber which has long life and is not subject to the frequent replacement of the usual friction disks. It has been found further that the coefficient of friction of the disks or wafers 33 is approximately the same for the "break-away" or starting movement of the parts as it is for the subsequent movements thereof which fact is of extreme importance in a friction shock absorber in that its action is smooth and uniformly effective throughout its operation. The fact that the material of which the wafers or disks 33 are formed is such as to be substantially unaffected by temperature variations and by speeds of operation is of the utmost significance in shock absorber construction, since it provides for a shock absorber which will function equally as well at all seasons and in various climates without the necessity of adjustments being made thereon.

Other and very important advantages found to exist in the shock absorber embodying the present invention are that the parts operate without noise or squeaks, while the metal parts in engagement with the disks or wafers 33 rather than becoming worn because of their engagement with said wafers or disks seem to become polished and hardened, thus further attributing long life to the shock absorber.

It has been found desirable that the disks or wafers 33 be maintained in a dry and clean condition and free from oils of any character and it will be noted that not only is the present construction such that the interior of the casing or cylinder will remain dry and free from dirt at all times, but also that suitable gaskets and sealing means are provided to preclude leakage of oil to the disks or wafers. It is in view of the desirability of maintaining the disks or wafers in a clean, dry and oilless condition that the cover 25 is permanently secured to the casing or cylinder 20, wherefore, inexperienced tampering with the interior mechanism of the shock absorber is prevented.

In Figs. 7, 8 and 9 there is illustrated a supplemental embodiment of the invention. Referring to Fig. 7 the chassis frame is indicated at 41 and the casing or cylinder 42 of the shock absorber is secured thereto as will be well understood. The base of the casing or cylinder 42 is provided with a centrally arranged opening having a suitable bushing 43 fitted therein and rotatably and slidably receiving the reduced smooth end 44 of an adjusting bolt 45 that is threaded into a central elongated boss 46 carried by the outer pressure plate 47 and extending through a central opening in the cover 48 of the shock absorber to a point beyond said cover. An inner pressure plate 49 is arranged on the bushing 43 and is held in contact with a friction disk or wafer 50 located between the pressure plate 49 and the bottom wall of the casing 42 by means of a pressure spring 51 arranged on the reduced end 44 of the adjusting screw and held in position by a ball spacer 52 also arranged on the end 44 of the screw and engaging the shoulder on the screw at the inner end of the threaded portion thereof. A friction disk or wafer 50 is arranged between the pressure plate 47 and the inner side of the cover 48. It will be noted that the pressure spring 51 holds the pressure plates 47 and 49 in engagement with the friction disks or wafers 50, while the adjusting screw 45 may be screwed inwardly or outwardly through the boss 46 to adjust the tension of the spring 51 and the frictional engagement between the pressure plates 47, 49 and the friction disks or wafers 50.

The pressure plate 49 is rotatable freely on the bushing 43 and is operatively connected to the pressure plate 47 by means of links 53 which are pivotally connected to the circumferences of the pressure plates 47 and 49, there being illustrated in the present instance three of the links 53. The links 53 are of such length and are so disposed with respect to the pressure plates 47 and 49 that when the plate 47 turns in one direction, the links 53 will assume a position parallel to the axis of the plate 47 with the result that the plates 47 and 49 will be held by the links in tight engagement with the friction disks 50 and will move together. When the pressure plate 47 rotates in the opposite direction the links 53 will assume an increasing angular position with respect to the axis of the plate 47, with the result that the plates 47 and 49 will not be held by the links in tight engagement with the friction disks or wafers and the retarding or braking action of the shock absorber will not be as great in the latter instance as is the case, of course, in the first mentioned instance.

The construction of the shock absorber forming the second and supplemental embodiment of the invention provides for the necessary differential action between the impact and recoil strokes. It will be understood that the friction disks 50 are formed of the same material as the friction disks 33 of the preferred embodiment of the invention. The outer end of the boss 46 is tapered and is provided with longitudinal serrations to receive in clamping engagement the split tubular end of the lever 54, which lever is connected through suitable links to the axle of the vehicle as will be well understood.

The cover 48 is illustrated as adjustable toward and away from the bottom of the casing or cylinder 42 so that adjustment may be made between the pressure plates 49 and 47 to vary the relationship of the links 53 and the differential action of the shock absorber during impact and recoil strokes. Suitable set screws 55 may be employed for locking the cover 48 in any of its adjusted positions.

In Figs. 10 and 11 there is illustrated a further supplemental embodiment of the invention and the shock absorber shown in said figures comprises a cylinder or casing 56 which is secured to the chassis frame as will be understood and is closed at its outer end by a head or cover 57 which screws onto the casing or cylinder 56. An operating shaft 58 is rotatably mounted in a bearing centrally arranged in the base of the casing and in an adjusting scew 59 that is screwed into a threaded opening located centrally of the cover or head 57 and in alignment with the bearing in the bottom of the casing. The shaft 58 is provided with an annular shoulder or flange 60 which acts to limit the inward movement of an inner pressure plate 61 that is splined to the shaft 58.

A floating friction disk or wafer 62 is arranged between the inner pressure plate 61 and a central pressure plate 63 which is splined to the casing or cylinder so as not to rotate with the shaft 58. A second friction disk or wafer 62 is arranged between the central pressure plate 63 and an outer pressure plate 64 which latter plate is splined to the shaft 58 to rotate therewith. A pressure spring 65 is arranged on the shaft 58 and its tension may be adjusted by the adjusting screw 59, wherefore the engagement between the inner pressure plate 61, center pressure plate 63 and outer pressure plate 64 and the friction disks or wafers 62 can be varied.

A coil spring 66 is arranged in the casing or cylinder 56 inwardly of the inner pressure plate 61 and has its opposite ends anchored respectively to the bottom of the casing or cylinder and to the inner pressure plate 61. It will be understood that the spring 66 is calibrated so as to effect the desired differential in the action of the shock absorber during impact and recoil strokes. The shaft 58 is connected to the operating lever 67, wherefore, when said lever moves in opposite directions the shaft 58 will be correspondingly rotated. It will be noted that in one direction of rotation of the shaft 58 the spring 66 will be wound up since the inner pressure plate 61, to which the spring is anchored, turns with the shaft 58. Of course, when the shaft 58 rotates in the opposite direction the spring 66 will be unwound. Inasmuch as both the inner pressure plate 61 and the outer pressure plate 64 turn with the shaft 58 in either direction of rotation of the latter and said plates are in engagement with the friction disks or wafers 62, it will be seen that the frictional resistance offered by the friction disks to the turning of the shaft 58 is the same for either direction of rotation of the shaft. However, as has been previously pointed out, the spring 66 must be wound up during one direction of rotation of the shaft 58, while it is unwound during the opposite direction of rotation of the shaft. The spring 66, therefore, acts to provide the desired differential in the action of the shock absorber during impact and recoil strokes. It will be understood that the friction disks or wafers 62 are formed of the same material as are the friction disks or wafers in the two embodiments of the invention previously described and that, therefore, a shock absorber constructed in accordance with the last two embodiments embraces the advantages and attains the objects of the invention similarly to the previously described forms.

Although several embodiments of the invention have been illustrated and described herein it should be understood that the invention is susceptible of various modifications and adaptations within the scope of the appended claims.

Having thus described my invention, I claim:

1. A shock absorber comprising a casing, relatively movable frictionally contacting members arranged therein, and means for causing relative movement between said members, one of said members having a low coefficient of friction and comprising finely powdered metal and graphite compressed and sintered.

2. A shock absorber comprising a casing, relatively movable frictionally contacting members arranged therein, and means for causing relative movement between said members, one of said members having a low coefficient of friction and comprising finely powdered copper and graphite compressed and sintered.

3. A shock absorber comprising a casing, relatively movable frictionally contacting members arranged therein, and means for causing relative movement between said members, one of said members having a low coefficient of friction and comprising powdered metal and an inert substance compressed and sintered.

4. A shock absorber comprising a casing, relatively movable members arranged therein, means for adjustably pressing said members into frictionally contacting relationship, means for causing relative movement between said members, one of said members having a low coefficient of friction and comprising finely powdered metal and an inert substance compressed and sintered.

5. A shock absorber comprising a casing, frictionally contacting members arranged therein and relatively movable in opposite directions, and means for causing relative movement between said members, one of said members having a low coefficient of friction and comprising finely powdered metal and an inert substance compressed and sintered.

6. A shock absorber comprising a casing, frictionally contacting members arranged therein and relatively movable in opposite directions, and means for causing relative movement between said members, one of said members having a low coefficient of friction and comprising finely powdered copper and graphite compressed and sintered.

7. A shock absorber comprising a casing, members arranged therein and relatively movable in opposite directions, means for adjustably pressing said members into frictionally contacting relationship, and means for causing relative movement between said members, one of said members having a low coefficient of friction and comprising finely powdered metal and an inert substance compressed and sintered.

8. A shock absorber comprising a casing, members arranged therein and relatively movable in opposite directions, means for adjustably pressing said members into frictionally contacting relationship, and means for causing relative movement between said members, one of said members having a low coefficient of friction and comprising finely powdered copper and graphite compressed and sintered.

9. A shock absorber comprising a casing, frictionally contacting members arranged therein and relatively movable in opposite directions, means for causing said relative movement between said members, and means creating a greater effective frictional resistance to the relative movement between said members in one direction than in the opposite direction, one of said members having a low coefficient of friction comprising powdered metal and an inert substance compressed and sintered.

10. A shock absorber comprising a casing, frictionally contacting members arranged therein and relatively movable in opposite directions, means for causing said relative movement between said members, and means creating a greater effective frictional resistance to the relative movement between said members in one direction than in the opposite direction, one of said members having a low coefficient of friction comprising finely powdered copper and an inert substance compressed and sintered.

11. A shock absorber comprising a casing, frictionally contacting members arranged therein and relatively movable in opposite directions, means for causing said relative movement between said members, and means creating a greater effective frictional resistance to the relative movement between said members in one direction than in the other direction, one of said members having a low coefficient of friction comprising powdered metal and graphite compressed and sintered.

12. A shock absorber comprising a casing, frictionally contacting members arranged therein and relatively movable in opposite directions, means for causing said relative movement between said members, and means creating a greater effective frictional resistance to the relative movement between said members in one direction than in the other drection, one of said members having a low coefficient of friction comprising finely powdered copper and graphite compressed and sintered.

13. A shock absorber comprising a casing, an oscillatable shaft therein, a member movable with said shaft in both directions of its oscillation, a member movable with said shaft in only one direction of its oscillation, and a frictional member arranged in engagement with both of said members whereby there is created a greater frictional resistance to the movement of said shaft in one direction than in the opposite direction.

14. A shock absorber comprising a casing, an oscillatable shaft therein, a member movable with said shaft in both directions of its oscillation, a member movable with said shaft in only one direction of its oscillation, and a member arranged in frictional engagement with both of said members and comprising bearing material having a relatively low coefficient of friction.

15. A shock absorber comprising a casing, an oscillatable shaft therein, a member movable with said shaft in both directions of its oscillation, a member movable with said shaft in only one direction of its oscillation, and a member arranged in frictional engagement with both of said members and comprising powdered metal and an inert substance compressed and sintered.

16. A shock absorber comprising a casing, an oscillatable shaft therein, a member movable with said shaft in both directions of its oscillation, a member movable with said shaft in only one direction of its oscillation, and a member arranged in frictional engagement with both of said members and comprising powdered copper and graphite compressed and sintered.

17. A shock absorber comprising a casing, an oscillatable shaft therein, a member concentric to and movable with said shaft in both directions of its oscillation, a member concentric to and movable with said shaft in only one direction of its oscillation and a frictional member concentric to said shaft and arranged in engagement with both of said members to resist the movement thereof whereby there is created a greater frictional resistance to the movement of said shaft in one direction than in the opposite direction.

18. A shock absorber comprising a casing, an oscillatable shaft therein, a member concentric to and movable with said shaft in both directions of its oscillation, a member concentric to said shaft and surrounding said first named member, means for operatively connecting said last named member with said first named member to move therewith in one direction only of its oscillation, and a frictional member concentric to said shaft and arranged in engagement with both of said first named members so as to resist movement thereof whereby there is created a greater frictional resistance to the movement of said shaft in one direction than in the opposite direction.

19. A shock absorber comprising a casing, an oscillatable shaft therein, a member concentric to and movable with said shaft in both directions of its oscillation, a member concentric to and movable with said shaft in only one direction of its oscillation, and a member arranged in frictional contact with both of said members and comprising a bearing material having a relatively low coefficient of friction.

20. A shock absorber comprising a casing, an oscillatable shaft therein, a member concentric to and movable with said shaft in both directions of its oscillation, a member concentric to said shaft and surrounding said first named member, means for operatively connecting said second named member with said first named member to move therewith in one direction only of its oscillation, and a member concentric to said shaft and arranged in frictional engagement with both of said first named members and comprising bearing material having a relatively low coefficient of friction.

21. A shock absorber comprising a casing, an oscillatable shaft therein, a member concentric to and movable with said shaft in both directions of its oscillation, a member concentric to and movable with said shaft in only one direction of its oscillation, and a member arranged in frictional engagement with both of said members and comprising finely powdered metal and an inert substance compressed and sintered.

22. A shock absorber comprising a casing, an oscillatable shaft therein, a member concentric to and movable with said shaft in both directions of its oscillation, a member concentric to and movable with said shaft in only one direction of its oscillation, and a member arranged in frictional engagement with both of said first named members and comprising finely powdered copper and graphite compressed and sintered.

23. A shock absorber comprising a casing, an oscillatable shaft therein, a cylindrical member concentric to and movable with said shaft in both directions of its oscillation, a ring surrounding said member with its end surfaces in the same planes as the end surfaces of said member, means for operatively connecting said ring to said member to move therewith in one direction only of its oscillation and a frictional member arranged in engagement with the end surfaces of said first named member and said ring whereby there is created a greater frictional resistance to the movement of said shaft in one direction than in the opposite direction.

24. A shock absorber comprising a casing, a shaft oscillatable therein, a pair of members oscillatable with said shaft and having movement endwise thereof, a member intermediate said pair of members and fixed with respect to the oscillating movement thereof, disks arranged between the members of said pair of members and said fixed member, means for holding said members in frictional contact with said disks, and a coil spring surrounding said shaft and having one end anchored to said casing and its opposite end to one of the members of said pair of members.

SAMUEL K. WELLMAN.